United States Patent
Ekern

Patent Number: 5,815,926
Date of Patent: Oct. 6, 1998

[54] INTERNAL PIPE CUTTER

[76] Inventor: Mark Ekern, 207 N. Prairie St., Flandreau, S. Dak. 57028

[21] Appl. No.: 870,040

[22] Filed: Jun. 5, 1997

[51] Int. Cl.$^6$ .................................................. B23D 21/08
[52] U.S. Cl. .............................................. 30/103; 30/102
[58] Field of Search ............................ 30/102, 103, 105; 82/82, 100

[56] References Cited

U.S. PATENT DOCUMENTS

| | | | |
|---|---|---|---|
| D. 273,194 | 3/1984 | House . | |
| 3,911,574 | 10/1975 | Jones | 30/103 |
| 3,999,292 | 12/1976 | Breese | 30/105 |
| 4,177,559 | 12/1979 | Anderson | 30/105 |
| 4,307,512 | 12/1981 | Phillips | 30/103 X |
| 4,369,573 | 1/1983 | Vitale | 30/103 |
| 4,466,185 | 8/1984 | Montiero | 30/103 |
| 4,932,125 | 6/1990 | Poveromo | 30/103 |

Primary Examiner—Douglas D. Watts

[57] ABSTRACT

A new Internal Pipe Cutter for providing a cutting tool designed for cutting the wall of a pipe from inside the pipe through an opening at one end of the pipe. The inventive device includes an elongated shaft having an upper end adapted for connection to a rotational power tool and a lower end to which a rotary cutting blade may be perpendicularly attached. A set collar is slidably mounted on and adjustably positioned along the shaft. A gripping sleeve is disposed around the set collar and is slidably and rotatably mounted on the shaft whereby the gripping sleeve and the set collar are conjointly positionable along the shaft and whereby the shaft and the set collar conjointly rotate independent of the gripping sleeve. The gripping sleeve includes a guide flange at a lower end thereof wherein the guide flange abuts the open end of the pipe as the rotary cutting blade is circled within the inside of the pipe. Accordingly, the set collar is locked on the shaft such that when the guide flange abuts the open end of the pipe, the rotary cutting blade will be at a desired level.

20 Claims, 2 Drawing Sheets

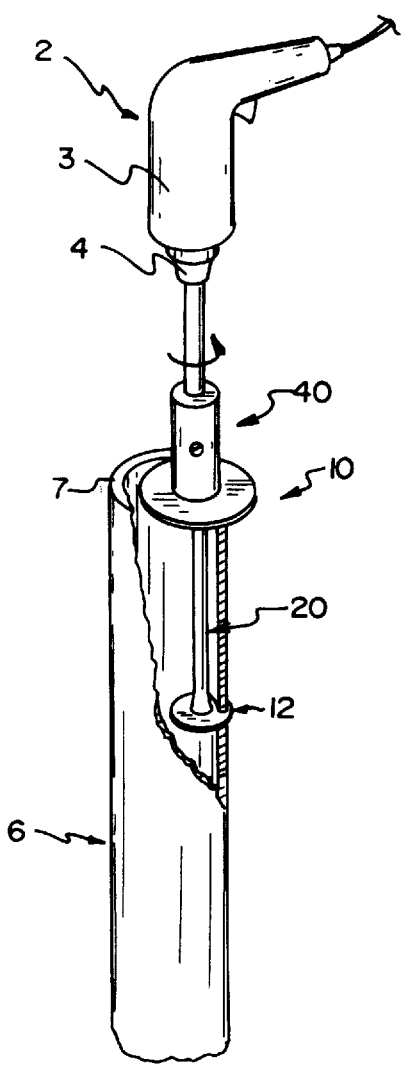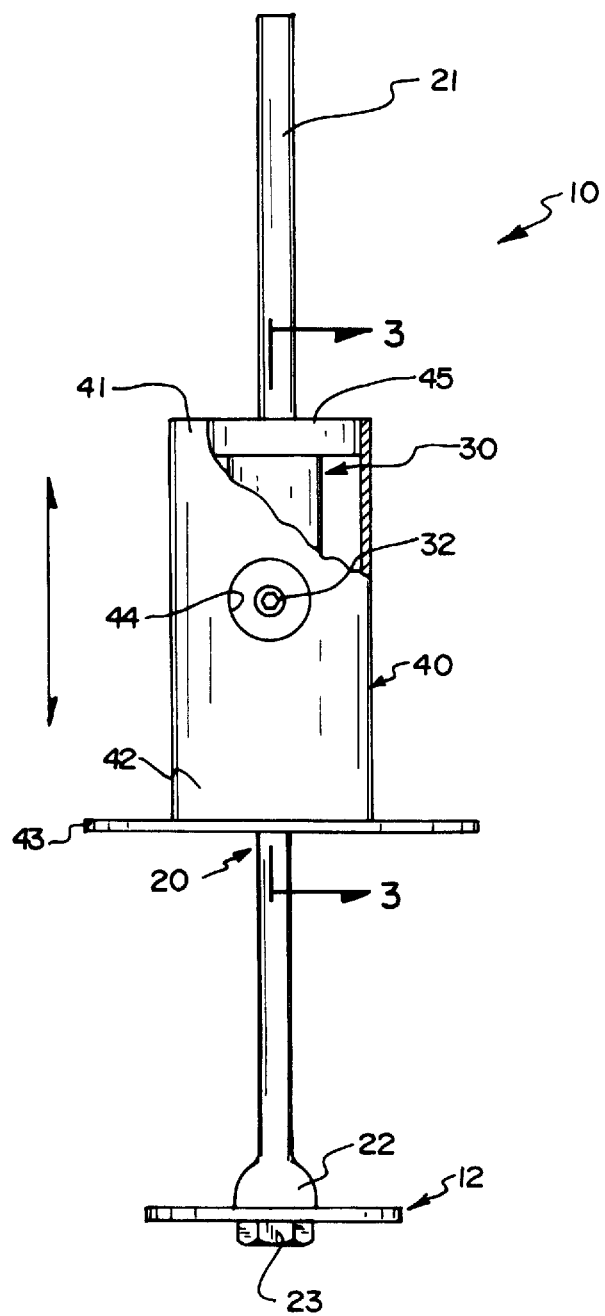

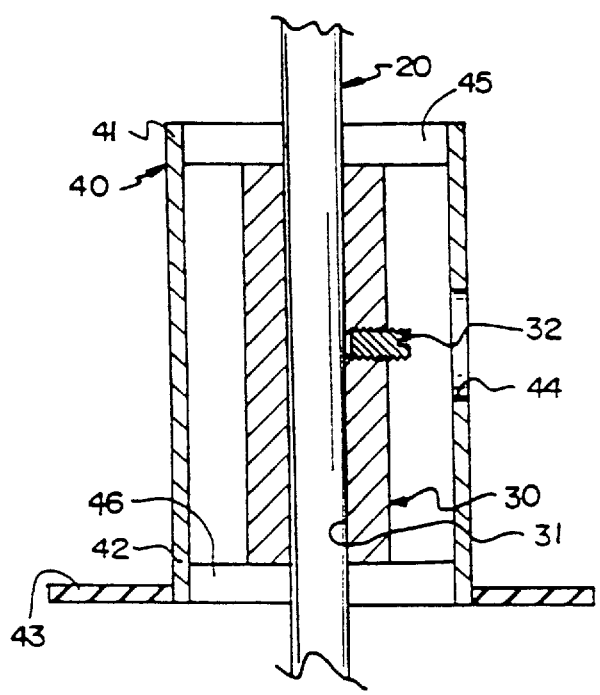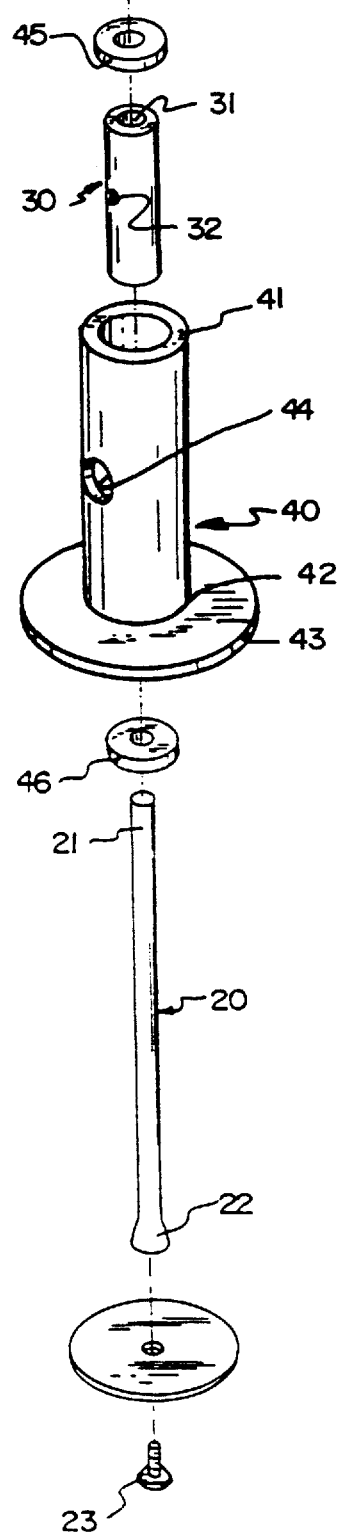

INTERNAL PIPE CUTTER

BACKGROUND OF THE INVENTION

1. Field of the Invention

The present invention relates to cutting tools and more particularly pertains to a new Internal Pipe Cutter for providing a cutting tool designed for cutting the wall of a pipe from inside the pipe through an opening at one end of the pipe.

2. Description of the Prior Art

The use of cutting tools is known in the prior art. More specifically, cutting tools heretofore devised and utilized are known to consist basically of familiar, expected and obvious structural configurations, notwithstanding the myriad of designs encompassed by the crowded prior art which have been developed for the fulfillment of countless objectives and requirements.

Known prior art cutting tools include U.S. Pat. No. 4,932,125; U.S. Pat. No. 4,307,512; U.S. Pat. No. 3,911,574; U.S. Pat. No. 4,369,573; U.S. Pat. No. 4,177,559; U.S. Pat. No. 3,999,292; U.S. Pat. No. 4,466,185; and U.S. Pat. No. D273,194.

While these devices fulfill their respective, particular objectives and requirements, the aforementioned patents do not disclose a new Internal Pipe Cutter. The inventive device includes an elongated shaft having an upper end adapted for connection to a rotational power tool and a lower end to which a rotary cutting blade may be perpendicularly attached. A set collar is slidably mounted on and adjustably positioned along the shaft. A gripping sleeve is disposed around the set collar and is slidably and rotatably mounted on the shaft whereby the gripping sleeve and the set collar are conjointly positionable along the shaft and whereby the shaft and the set collar conjointly rotate independent of the gripping sleeve. The gripping sleeve includes a guide flange at a lower end thereof wherein the guide flange abuts the open end of the pipe as the rotary cutting blade is circled within the inside of the pipe. Accordingly, the set collar is locked on the shaft such that when the guide flange abuts the open end of the pipe, the rotary cutting blade will be at a desired level.

In these respects, the Internal Pipe Cutter according to the present invention substantially departs from the conventional concepts and designs of the prior art, and in so doing provides an apparatus primarily developed for the purpose of providing a cutting tool designed for cutting the wall of a pipe from inside the pipe through an opening at one end of the pipe.

SUMMARY OF THE INVENTION

In view of the foregoing disadvantages inherent in the known types of cutting tools now present in the prior art, the present invention provides a new Internal Pipe Cutter construction wherein the same can be utilized for providing a cutting tool designed for cutting the wall of a pipe from inside the pipe through an opening at one end of the pipe.

The general purpose of the present invention, which will be described subsequently in greater detail, is to provide a new Internal Pipe Cutter apparatus and method which has many of the advantages of the cutting tools mentioned heretofore and many novel features that result in a new Internal Pipe Cutter which is not anticipated, rendered obvious, suggested, or even implied by any of the prior art cutting tools, either alone or in any combination thereof.

To attain this, the present invention generally comprises an elongated shaft having an upper end adapted for connection to a rotational power tool and a lower end to which a rotary cutting blade may be perpendicularly attached. A set collar is slidably mounted on and adjustably positioned along the shaft. A gripping sleeve is disposed around the set collar and is slidably and rotatably mounted on the shaft whereby the gripping sleeve and the set collar are conjointly positionable along the shaft and whereby the shaft and the set collar conjointly rotate independent of the gripping sleeve. The gripping sleeve includes a guide flange at a lower end thereof wherein the guide flange abuts the open end of the pipe as the rotary cutting blade is circled within the inside of the pipe. Accordingly, the set collar is locked on the shaft such that when the guide flange abuts the open end of the pipe, the rotary cutting blade will be at a desired level.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Internal Pipe Cutter apparatus and method which has many of the advantages of the cutting tools mentioned heretofore and many novel features that result in a new Internal Pipe Cutter which is not anticipated, rendered obvious, suggested, or even implied by any of the prior art cutting tools, either alone or in any combination thereof.

It is another object of the present invention to provide a new Internal Pipe Cutter which may be easily and efficiently manufactured and marketed.

It is a further object of the present invention to provide a new Internal Pipe Cutter which is of a durable and reliable construction.

An even further object of the present invention is to provide a new Internal Pipe Cutter which is susceptible of a low cost of manufacture with regard to both materials and labor, and which accordingly is then susceptible of low prices of sale to the consuming public, thereby making such Internal Pipe Cutter economically available to the buying public.

Still yet another object of the present invention is to provide a new Internal Pipe Cutter which provides in the apparatuses and methods of the prior art some of the advantages thereof, while simultaneously overcoming some of the disadvantages normally associated therewith.

Still another object of the present invention is to provide a new Internal Pipe Cutter for providing a cutting tool designed for cutting the wall of a pipe from inside the pipe through an opening at one end of the pipe.

Yet another object of the present invention is to provide a new Internal Pipe Cutter which includes an elongated shaft having an upper end adapted for connection to a rotational power tool and a lower end to which a rotary cutting blade may be perpendicularly attached. A set collar is slidably mounted on and adjustably positioned along the shaft. A gripping sleeve is disposed around the set collar and is slidably and rotatably mounted on the shaft whereby the gripping sleeve and the set collar are conjointly positionable along the shaft and whereby the shaft and the set collar conjointly rotate independent of the gripping sleeve. The gripping sleeve includes a guide flange at a lower end thereof wherein the guide flange abuts the open end of the pipe as the rotary cutting blade is circled within the inside of the pipe. Accordingly, the set collar is locked on the shaft such that when the guide flange abuts the open end of the pipe, the rotary cutting blade will be at a desired level.

Still yet another object of the present invention is to provide a new Internal Pipe Cutter that enables a user thereof to cut a section of pipe from within when there is inadequate clearance around the outside of the pipe. During building construction a plumber will often install pipes for a toilet, shower, or tub drain before the floor is finished. Thus, the pipes are left overlong so that they may be cut to the necessary length after the floor is finished. After the floor has been finished, the plumber must often cut the pipe at a level below the finished floor to allow for adequate connection of the toilet, shower, or tub drain. Typically, there is not enough space around the outside of the pipe for adequately cutting the pipe at the desired level. Accordingly, the present invention may be used to cut the pipe at the desired level from within the pipe.

Even still another object of the present invention is to provide a new Internal Pipe Cutter that which may be easily and adequately manipulated while positioned within a section of pipe.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an illustration of a new Internal Pipe Cutter in use according to the present invention.

FIG. 2 is a side view of the present invention.

FIG. 3 is a cross sectional view taken along line 3—3 of FIG. 2.

FIG. 4 is an exploded isometric illustration of the present invention.

DESCRIPTION OF THE PREFERRED EMBODIMENT

With reference now to the drawings, and in particular to FIGS. 1 through 4 thereof, a new Internal Pipe Cutter embodying the principles and concepts of the present invention and generally designated by the reference numeral 10 will be described.

As best illustrated in FIGS. 1 through 4, the Internal Pipe Cutter 10 comprises an elongated shaft 20 having an upper end 21 adapted for connection to a rotational power tool 2 and a lower end 22 to which a rotary cutting blade 12 may be perpendicularly attached. A set collar 30 is slidably mounted on and adjustably positioned along the shaft 20. A gripping sleeve 40 is disposed around the set collar 30 and is slidably and rotatably mounted on the shaft 20 whereby the gripping sleeve 40 and the set collar 30 are conjointly positionable along the shaft 20 and whereby the shaft 20 and the set collar 30 conjointly rotate independent of the gripping sleeve 40. The gripping sleeve 40 includes a guide flange 43 at a lower end 42 thereof wherein the guide flange 43 abuts the open end 7 of the pipe 6 as the rotary cutting blade 12 is circled within the inside of the pipe 6. Accordingly, the set collar 30 is locked on the shaft 20 such that when the guide flange 43 abuts the open end 7 of the pipe 6, the rotary cutting blade 12 will be at a desired level.

The Internal Pipe Cutter 10 is intended for use with a rotational power tool 2 such as an electric drill 3. Accordingly, the electric drill 3 includes a chuck 4 into which the upper end 21 of the shaft 20 is inserted.

The set collar 30 is cylindrical shaped and has a bore 31 longitudinally therethrough. Accordingly, the bore 31 is sized for slidably receiving the shaft 20. A set screw 32 is threadingly mounted in the set collar 30 and is used for locking the set collar 30 in a particular position along the shaft 20.

The gripping sleeve 40 has an upper end 41 and a lower end 42 and is of a length sufficient for grasping thereof in a hand of a user. The guide flange 43 projects radially outward from the lower end 42 of the gripping sleeve 40. The gripping sleeve 40 has a hole 44 through one side thereof so as to permit access to the set screw 32. As such, the user may lock the set collar 30 on the shaft 20 such that the guide flange 43 is spaced a desired distance from the rotary cutting blade 12.

The gripping sleeve 40 is rotatably mounted on the shaft 20 by an upper bearing 45 and a lower bearing 46. The upper bearing 45 is adjacent the upper end 41 of the gripping sleeve 40 and the lower bearing 46 is adjacent the lower end 42 of the gripping sleeve 40. Accordingly, the set collar 30 is positioned between the upper bearing 45 and the lower bearing 46 in abutting engagement therewith. The upper bearing 45 and the lower bearing 46 each include an inner race and an outer race wherein each inner race is sized for slidably receiving the shaft 20 and each outer race is sized for fitting within the gripping sleeve 40. Accordingly, each outer race is secured within the gripping sleeve 40.

The rotary cutting blade 12 has a diameter less than the inside diameter of the pipe 6 so as to fit inside the pipe 6. Preferably, the rotary cutting blade 12 has a diameter generally equal to or less than the diameter of the guide flange 43 such that the guide flange 43 abuts the open end 7 of the pipe 6 as the rotary cutting blade 12 is circled within the inside of the pipe 6. The rotary cutting blade 12 is removably attached to the shaft 20 by a bolt 23 threadingly fitted into the lower end 22 of the shaft 20. Accordingly, the rotary cutting blade 12 may be easily replaced.

In use, the set collar 30 is positioned along the shaft 20 such that the guide flange 43 is spaced from the rotary cutting blade 12 corresponding to the length of the pipe desired to be cut. Accordingly, the lower end 22 of the shaft 20 and the rotary cutting blade 12 are inserted through the open end 7 of the pipe 6. As such, the guide flange 43 is rested on the open end 7 of the pipe 6 thereby controlling the distance of entry of the shaft 20 and rotary cutting blade 12 into the pipe 6.

To cut the pipe 6, the user holds the electric drill 3 with one hand and holds the gripping sleeve 40 with the other hand. Accordingly, the shaft 20, the set collar 30, and the rotary cutting blade 12 conjointly rotate as the user holds the gripping sleeve 40. While holding the gripping sleeve 40, the user guides and circles the rotary cutting blade 12 within the inside of the pipe 6. By keeping the guide flange 43 in contact with the open end 7 of the pipe 6, the user may control the path of the rotary cutting blade 12 so as to achieve a clean cut of the pipe 6.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A pipe cutter for use in cutting a pipe having a perimeter pipe wall and an open end formed by a perimeter edge of the perimeter pipe wall, comprising:

an elongated shaft having an upper end and a lower end, said upper end adapted for connection to a rotational power tool;

a rotary cutting blade removably attached to said lower end of said shaft;

a set collar slidably mounted on and adjustably positioned along said shaft;

a gripping sleeve disposed around said set collar, said gripping sleeve having an upper end and a lower end, said gripping sleeve slidably and rotatably mounted on said shaft whereby said gripping sleeve and said set collar are conjointly positionable along said shaft and whereby said shaft and said set collar conjointly rotate independent of said gripping sleeve, said gripping sleeve including a guide flange projecting radially outward from said lower end thereof, said guide flange abutting said open end of said pipe as said rotary cutting blade is circled within said pipe;

wherein said guide flange has an outer perimeter edge forming the radially widest part of the gripping sleeve, and wherein said guide flange has a substantially planar lower surface extending radially outward from said elongated shaft to the outer perimeter edge of said guide flange to present a substantially flat surface across the lower surface of said guide flange for abutting against the perimeter edge of the perimeter pipe wall.

2. The pipe cutter of claim 1, further comprising:

a locking means for locking said set collar along said shaft.

3. The pipe cutter of claim 2, wherein said locking means comprises:

a set screw threadingly mounted in said set collar, and wherein said gripping sleeve has a hole through one side thereof, said hole permitting access to said set screw.

4. The pipe cutter of claim 1, wherein said gripping sleeve is of a length sufficient for grasping thereof in a hand of a user.

5. The pipe cutter of claim 1, wherein said rotary cutting blade has a diameter less than the diameter of said guide flange such that said guide flange abuts said open end of said pipe as said rotary cutting blade is circled within said pipe.

6. The pipe cutter of claim 1, further comprising:

an upper bearing rotatably mounting said upper end of said gripping sleeve on said shaft, and a lower bearing rotatably mounting said lower end of said gripping sleeve on said shaft, said upper bearing and said lower bearing each including an inner race and an outer race, said inner race sized for slidably receiving said shaft and said outer race sized for fitting within said gripping sleeve, said outer race secured within said gripping sleeve, and wherein said set collar is positioned between said upper bearing and said lower bearing in abutting engagement therewith.

7. A pipe cutter for use in cutting a pipe having an open end, comprising:

an elongated shaft having an upper end and a lower end, said upper end adapted for connection to a rotational power tool;

a rotary cutting blade removably attached to said lower end of said shaft;

a set collar slidably mounted on and adjustably positioned along said shaft, said set collar including a set screw threadingly mounted therein, said set screw locking said set collar in a particular position along said shaft;

a gripping sleeve having an upper end and a lower end, said gripping sleeve disposed around said set collar and having a hole through one side thereof, said hole permitting access to said set screw, said gripping sleeve slidably and rotatably mounted on said shaft whereby said gripping sleeve and said set collar are conjointly positionable along said shaft and whereby said shaft and said set collar conjointly rotate independent of said gripping sleeve, said gripping sleeve including a guide flange projecting radially outward from said lower end thereof, said guide flange abutting said open end of said pipe as said rotary cutting blade is circled within said pipe.

8. The pipe cutter of claim 7, wherein said gripping sleeve is of a length sufficient for grasping thereof in a hand of a user.

7

9. The pipe cutter of claim 7, wherein said rotary cutting blade has a diameter less than the diameter of said guide flange such that said guide flange abuts said open end of said pipe as said rotary cutting blade is circled within said pipe.

10. The pipe cutter of claim 7, further comprising:

an upper bearing rotatably mounting said upper end of said gripping sleeve on said shaft, and a lower bearing rotatably mounting said lower end of said gripping sleeve on said shaft, said upper bearing and said lower bearing each including an inner race and an outer race, said inner race sized for slidably receiving said shaft and said outer race sized for fitting within said gripping sleeve, said outer race secured within said gripping sleeve, and wherein said set collar is positioned between said upper bearing and said lower bearing in abutting engagement therewith.

11. A pipe cutter for use in cutting a pipe having an open end, comprising:

an elongated shaft having an upper end and a lower end, said upper end adapted for connection to a rotational power tool;

a rotary cutting blade removably attached to said lower end of said shaft;

a set collar slidably mounted on and adjustably positioned along said shaft;

a gripping sleeve disposed around said set collar, said gripping sleeve having an upper end and a lower end, said gripping sleeve slidably and rotatably mounted on said shaft whereby said gripping sleeve and said set collar are conjointly positionable along said shaft and whereby said shaft and said set collar conjointly rotate independent of said gripping sleeve;

said gripping sleeve including a guide flange projecting radially outward from said lower end thereof, said guide flange abutting said open end of said pipe as said rotary cutting blade is circled within said pipe; and a locking means for locking said set collar along said shaft;

wherein said locking means comprises a set screw threadingly mounted in said set collar, and wherein said gripping sleeve has a hole through one side thereof, said hole permitting access to said set screw.

12. The pipe cutter of claim 11, further comprising:

a locking means for locking said set collar along said shaft.

13. The pipe cutter of claim 11, wherein said gripping sleeve is of a length sufficient for grasping thereof in a hand of a user.

14. The pipe cutter of claim 11, wherein said rotary cutting blade has a diameter less than the diameter of said guide flange such that said guide flange abuts said open end of said pipe as said rotary cutting blade is circled within said pipe.

15. The pipe cutter of claim 11, further comprising:

an upper bearing rotatably mounting said upper end of said gripping sleeve on said shaft, and a lower bearing rotatably mounting said lower end of said gripping sleeve on said shaft,

8 said upper bearing and said lower bearing each including an inner race and an outer race, said inner race sized for slidably receiving said shaft and said outer race sized for fitting within said gripping sleeve, said outer race secured within said gripping sleeve, and wherein said set collar is positioned between said upper bearing and said lower bearing in abutting engagement therewith.

16. A pipe cutter for use in cutting a pipe having an open end, comprising:

an elongated shaft having an upper end and a lower end, said upper end adapted for connection to a rotational power tool;

a rotary cutting blade removably attached to said lower end of said shaft;

a set collar slidably mounted on and adjustably positioned along said shaft;

a gripping sleeve disposed around said set collar, said gripping sleeve having an upper end and a lower end, said gripping sleeve slidably and rotatably mounted on said shaft whereby said gripping sleeve and said set collar are conjointly positionable along said shaft and whereby said shaft and said set collar conjointly rotate independent of said gripping sleeve;

said gripping sleeve including a guide flange projecting radially outward from said lower end thereof, said guide flange abutting said open end of said pipe as said rotary cutting blade is circled within said pipe;

an upper bearing rotatably mounting said upper end of said gripping sleeve on said shaft, and a lower bearing rotatably mounting said lower end of said gripping sleeve on said shaft, said upper bearing and said lower bearing each including an inner race and an outer race, said inner race sized for slidably receiving said shaft and said outer race sized for fitting within said gripping sleeve, said outer race secured within said gripping sleeve, and wherein said set collar is positioned between said upper bearing and said lower bearing in abutting engagement therewith.

17. The pipe cutter of claim 16, further comprising:

a locking means for locking said set collar along said shaft.

18. The pipe cutter of claim 16, wherein said locking means comprises:

a set screw threadingly mounted in said set collar, and wherein said gripping sleeve has a hole through one side thereof, said hole permitting access to said set screw.

19. The pipe cutter of claim 16, wherein said gripping sleeve is of a length sufficient for grasping thereof in a hand of a user.

20. The pipe cutter of claim 16, wherein said rotary cutting blade has a diameter less than the diameter of said guide flange such that said guide flange abuts said open end of said pipe as said rotary cutting blade is circled within said pipe.

* * * * *